United States Patent
Timmons et al.

(10) Patent No.: US 9,452,522 B2
(45) Date of Patent: *Sep. 27, 2016

(54) MAGNETIC DRILL PRESS

(71) Applicant: Milwaukee Electric Tool Corporation, Brookfield, WI (US)

(72) Inventors: Terry L. Timmons, Milwaukee, WI (US); James Wekwert, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/856,073

(22) Filed: Sep. 16, 2015

(65) Prior Publication Data

US 2016/0001440 A1 Jan. 7, 2016

Related U.S. Application Data

(63) Continuation of application No. 14/256,255, filed on Apr. 18, 2014, now Pat. No. 9,242,367.

(60) Provisional application No. 61/813,813, filed on Apr. 19, 2013, provisional application No. 61/898,790, filed on Nov. 1, 2013.

(51) Int. Cl.
*B23B 45/14* (2006.01)
*B25H 1/00* (2006.01)
(Continued)

(52) U.S. Cl.
CPC ............ *B25H 1/0071* (2013.01); *B23Q 3/1546* (2013.01); *B23Q 17/2404* (2013.01); *Y10T 408/554* (2015.01); *Y10T 408/6779* (2015.01); *Y10T 408/6786* (2015.01)

(58) Field of Classification Search
CPC ..... B23B 47/26; B23B 47/28; B23B 39/006; B23B 2260/118; B23B 35/00–49/06; B23B 45/15; B23Q 17/22; B23Q 17/2233; B23Q 17/2275; B23Q 17/2414; B23Q 17/2419; B25H 1/0071; B25H 1/0064; B25H 1/0057; B25H 1/0021; Y10T 408/554; Y10T 408/13–408/16; Y10T 408/165; Y10T 408/17; Y10T 408/172; Y10T 408/173; Y10T 408/175; Y10T 408/6786
USPC .......................... 408/5–13, 16, 76, 132, 136
See application file for complete search history.

(56) References Cited

U.S. PATENT DOCUMENTS

| 2,209,558 A | 7/1940 | Bing et al. |
| 2,280,437 A | 4/1942 | Levesque |

(Continued)

FOREIGN PATENT DOCUMENTS

| JP | 2002254227 | 9/2002 |
| JP | 2004009149 | 1/2004 |

(Continued)

OTHER PUBLICATIONS

International Search Report and Written Opinion for Application No. PCT/US2014/034627 dated Aug. 29, 2014 (14 pages).

(Continued)

*Primary Examiner* — Daniel Howell
*Assistant Examiner* — Nicole N Ramos
(74) *Attorney, Agent, or Firm* — Michael Best & Friedrich LLP

(57) ABSTRACT

A magnetic base for selectively magnetically latching to a ferromagnetic surface includes a magnet holder, a fixed magnet assembly supported within the magnet holder, a movable magnet assembly supported within the magnet holder, and a transmission. The transmission includes an input, an output coupled to the movable magnet assembly for moving the rotatable movable assembly relative to the fixed magnet assembly through a predetermined range of motion, and a plurality of transmission elements positioned between the output and the input. The transmission elements are configured to provide a variable mechanical advantage between the output and the input during at least a portion of the predetermined range of motion.

20 Claims, 11 Drawing Sheets

(51) Int. Cl.
  *B23Q 3/154* (2006.01)
  *B23Q 17/24* (2006.01)

(56) References Cited

U.S. PATENT DOCUMENTS

| | | | |
|---|---|---|---|
| RE24,203 E | 8/1956 | Buck | |
| 2,820,377 A | 1/1958 | Buck | |
| 3,010,054 A | 11/1961 | Goudsmit | |
| 3,342,089 A | 9/1967 | Palm | |
| 3,387,509 A | 6/1968 | Lupear | |
| 3,452,310 A | 6/1969 | Israelson | |
| 3,540,320 A | 11/1970 | Martinmaas | |
| 3,677,656 A | 7/1972 | Buck | |
| 3,762,829 A | 10/1973 | Yilmaz | |
| 4,012,162 A | 3/1977 | Warren | |
| 4,055,824 A | 10/1977 | Baermann | |
| 4,094,612 A | 6/1978 | Krieg | |
| RE30,519 E | 2/1981 | Hougen | |
| 4,251,791 A | 2/1981 | Yanagisawa et al. | |
| 4,261,673 A | 4/1981 | Hougen | |
| 4,329,673 A | 5/1982 | Ichikune et al. | |
| 4,379,277 A * | 4/1983 | Braillon | B23Q 3/1546 335/295 |
| 4,390,309 A | 6/1983 | Fangmann | |
| 4,393,363 A | 7/1983 | Iwasaki | |
| 4,465,993 A * | 8/1984 | Braillon | H01F 7/0257 294/65.5 |
| 4,639,170 A | 1/1987 | Palm | |
| 4,892,447 A | 1/1990 | Schmidt | |
| 4,936,720 A | 6/1990 | Dolatowski et al. | |
| 5,051,044 A | 9/1991 | Allen | |
| 5,096,339 A | 3/1992 | Shoji | |
| 5,266,914 A | 11/1993 | Dickson et al. | |
| 5,275,514 A | 1/1994 | Johnson | |
| 5,462,392 A | 10/1995 | Hardwick | |
| 5,525,950 A | 6/1996 | Wang | |
| 5,848,859 A | 12/1998 | Clark et al. | |
| 6,050,753 A | 4/2000 | Turner | |
| 6,331,810 B1 | 12/2001 | Jung | |
| 6,489,871 B1 | 12/2002 | Barton | |
| 6,761,511 B2 | 7/2004 | Turner | |
| 6,994,305 B2 | 2/2006 | Schenk, Jr. | |
| 7,009,480 B2 | 3/2006 | Tsui et al. | |
| 7,012,495 B2 | 3/2006 | Underwood et al. | |
| 7,125,206 B2 | 10/2006 | Turner | |
| 7,161,451 B2 | 1/2007 | Shen | |
| 7,224,251 B2 | 5/2007 | Wang | |
| 7,360,973 B2 | 4/2008 | Turner | |
| 7,396,194 B2 | 7/2008 | Jones, III | |
| 7,435,041 B2 | 10/2008 | McGill | |
| 7,549,359 B2 | 6/2009 | Hennessey et al. | |
| 8,183,965 B2 | 5/2012 | Michael | |
| 8,272,813 B1 | 9/2012 | Wise | |
| 8,350,663 B1 | 1/2013 | Michael | |
| 8,368,494 B2 | 2/2013 | Fiedler | |
| 8,376,667 B2 | 2/2013 | Wilbert et al. | |
| 2006/0104731 A1 | 5/2006 | Etter et al. | |
| 2006/0250714 A1 | 11/2006 | von Limburg | |
| 2009/0027149 A1 | 1/2009 | Kocijan | |
| 2009/0028653 A1 | 1/2009 | Wilbert et al. | |
| 2009/0196696 A1 | 8/2009 | Otsuka et al. | |
| 2011/0174095 A1 * | 7/2011 | Lindsey | F01C 3/02 74/63 |
| 2012/0141217 A1 | 6/2012 | Sharp | |
| 2013/0002382 A1 | 1/2013 | Zhang et al. | |
| 2013/0287508 A1 | 10/2013 | Timmons et al. | |
| 2015/0306679 A1 * | 10/2015 | Brotto | B23B 39/006 408/16 |

FOREIGN PATENT DOCUMENTS

| | | |
|---|---|---|
| WO | 2010/020006 | 2/2010 |
| WO | 2010/135788 | 12/2010 |
| WO | 2012/144769 | 10/2012 |
| WO | 2013/163412 | 10/2013 |

OTHER PUBLICATIONS

Milwaukee, "Service Parts List, Mag Stand Assembly," 2011, Bulletin No. 54-46-0400 (4 pages).

* cited by examiner

MAGNETIC DRILL PRESS

CROSS-REFERENCE TO RELATED APPLICATIONS

This application is a continuation of co-pending U.S. patent application Ser. No. 14/256,255 filed on Apr. 18, 2014, which claims priority to U.S. Provisional Patent Application No. 61/813,813 filed on Apr. 19, 2013 and U.S. Provisional Patent Application No. 61/898,790 filed on Nov. 1, 2013. The entire contents of each of the foregoing applications are incorporated herein by reference.

FIELD OF THE INVENTION

The present invention relates to power tools, and more specifically to magnetic drill presses.

BACKGROUND OF THE INVENTION

Magnetic drill presses perform drilling operations by latching a magnetic base of the drill press to a ferromagnetic workpiece. Such magnetic bases use electromagnets or permanent magnets for generating a magnetic field. A magnetic base with permanent magnets typically physically reorient at least some of the permanent magnets to switch the base between a latched configuration and a release configuration.

SUMMARY OF THE INVENTION

The invention provides, in one aspect, a magnetic drill press including a main housing, a drill unit supported by the main housing for relative movement therewith in a direction of a rotational axis of the drill unit, and a base coupled to the main housing for selectively magnetically latching to a ferromagnetic workpiece. The base includes a magnet holder, a fixed magnet assembly supported within the magnet holder, a rotatable magnet assembly supported within the magnet holder, and a transmission. The transmission includes an input, an output coupled to the rotatable magnet assembly for rotating the rotatable magnet assembly relative to the fixed magnet assembly through a predetermined rotation angle, and a gear train positioned between the output and the input. The gear train is configured to provide a variable gear ratio between the output and the input during at least a portion of the predetermined rotation angle.

The invention provides, in another aspect, a magnetic drill press including a main housing, a drill unit supported by the main housing for relative movement therewith in a direction of a rotational axis of the drill unit, and a magnetic base coupled to the main housing for selectively magnetically latching to a ferromagnetic workpiece. The magnetic base includes a plurality of grooves formed on a surface of the magnetic base engageable with the ferromagnetic workpiece.

The invention provides, in another aspect, a magnetic base for selectively magnetically latching to a ferromagnetic surface. The magnetic base includes a magnet holder, a fixed magnet assembly supported within the magnet holder, a movable magnet assembly supported within the magnet holder, and a transmission. The transmission includes an input, an output coupled to the movable magnet assembly for moving the movable magnet assembly relative to the fixed magnet assembly through a predetermined range of motion, and a plurality of transmission elements positioned between the output and the input. The transmission elements are configured to provide a variable mechanical advantage between the output and the input during at least a portion of the predetermined range of motion.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
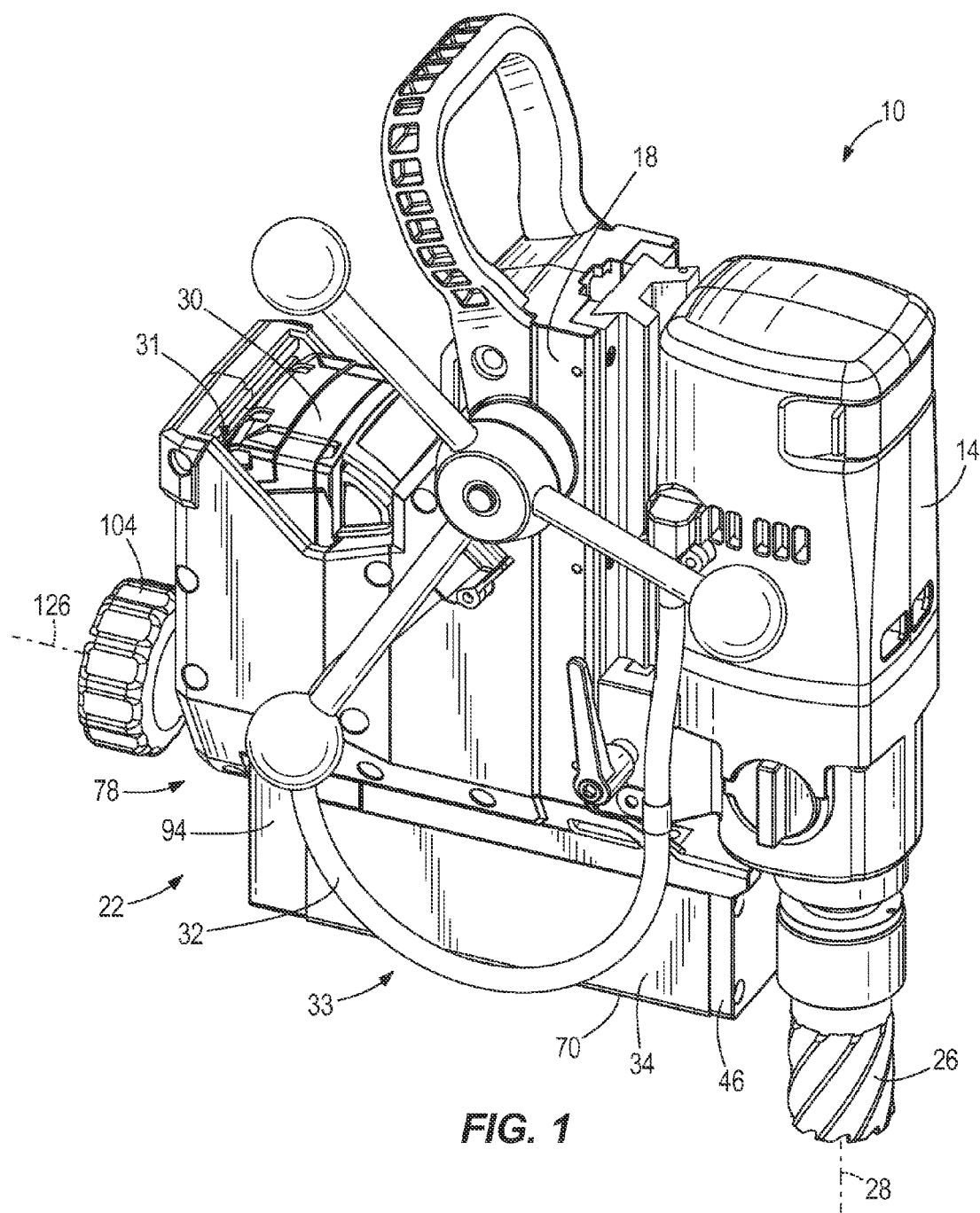
FIG. 1 is a perspective view of a magnetic drill press including a magnetic base in accordance with an embodiment of the invention.

FIG. 1 illustrates a magnetic drill press 10 including a drill unit 14, a main housing 18 to support the drill unit 14, and a magnetic base 22 coupled to the main housing 18 and selectively magnetically latching the magnetic drill press 10 to a ferromagnetic workpiece (not shown). The drill unit 14 may include a DC motor or an AC motor to rotate a spindle with a working tool 26 attached thereto about a rotational axis 28. The drill unit 14 is supported by the main housing 18 for relative movement therewith in a direction along the rotational axis 28. The magnetic drill press 10 may be powered by a battery 30 as shown in the illustrated embodiment, from an AC voltage input (i.e., from a wall outlet), or by an alternative DC voltage input (e.g., a DC power supply).

Figure 11:
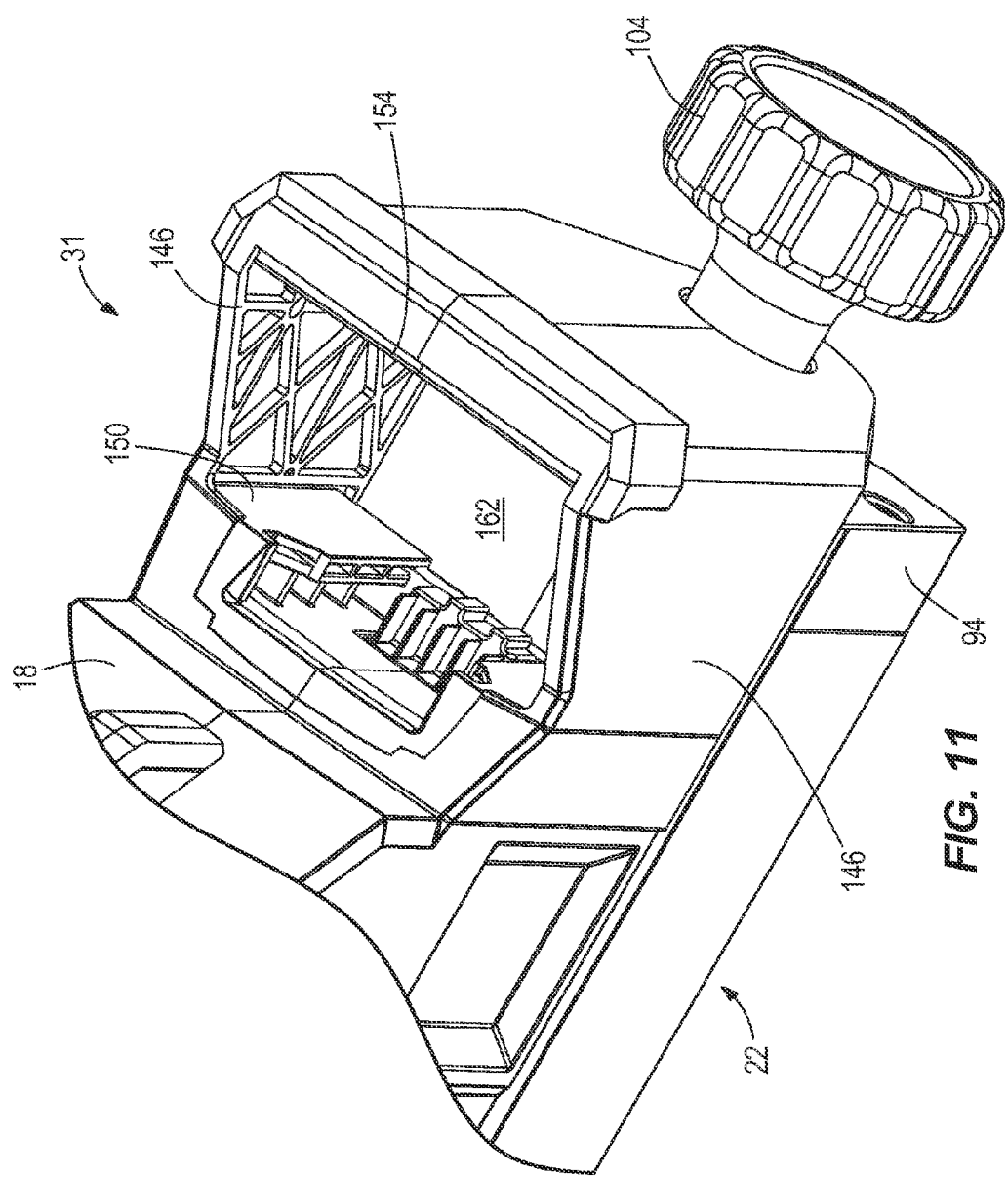
FIG. 11 is a rear perspective view of a battery receptacle of the magnetic drill press of FIG. 1.

The battery 30 is selectively electrically connected with the drill unit 14, and the main housing 18 includes a receptacle 31 in which the battery 30 is at least partially received. In the illustrated embodiment, a majority of the battery 30 is contained within the receptacle 31. With reference to FIG. 11, the receptacle 31 is defined by two side walls 146, a rear wall 150, a front wall 154, and a bottom wall 162. These walls 146, 150, 154, 162 protect and shield the battery 30 from impacts, and in the illustrated embodiment, all but one side of the battery 30 is at least partially shielded within the receptacle 31.

With reference to FIG. 1, a power cord 32 extends between the main housing 18 and the drill unit 14 for delivering power from the battery 30 to the drill unit 14. The power cord 32 forms a loop with a bottom portion 33 proximate the base 22. By routing the power cord 32 in this manner, the overall height profile of the magnetic drill press 10 is reduced compared to other commercially available drill presses. In addition, by routing the power cord 32 in this manner, a user is discouraged from misusing the power cord 32 as a way to carry the magnetic drill press 10.

Figure 5A:
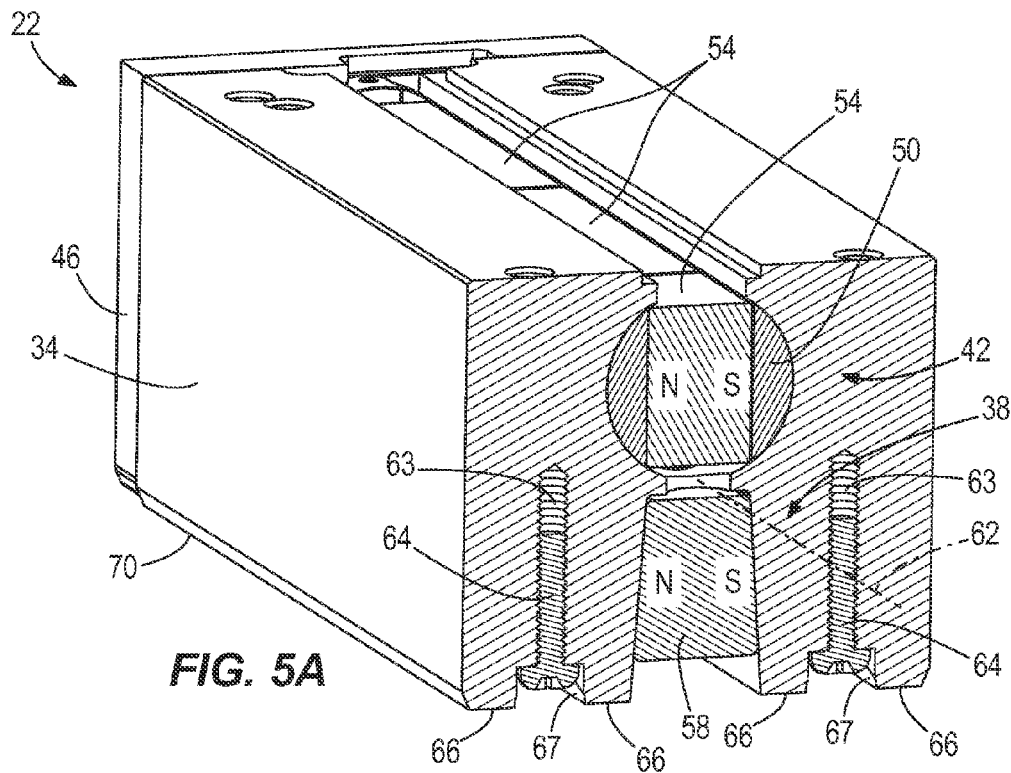
FIG. 5A is a cross-sectional view of the magnetic base of FIG. 2 in a latching configuration taken along the line 5A-5A in FIG. 2.
Figure 5B:
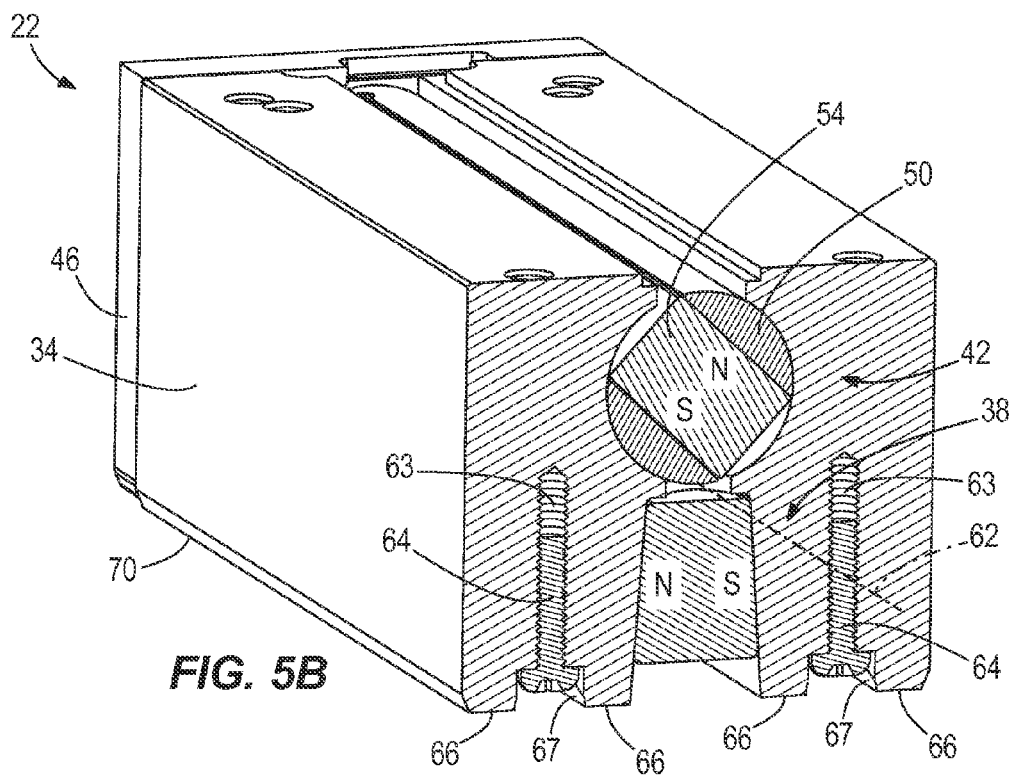
FIG. 5B is a cross-sectional view of the magnetic base of FIG. 2 in a release configuration.

With reference to FIGS. 5A and 5B, the magnetic base 22 includes a magnet holder 34, a fixed magnet assembly 38 supported within the magnet holder 34, and a rotatable magnet assembly 42 supported within the magnet holder 34 and spaced from the fixed magnet assembly 38. In the illustrated embodiment, the magnet assembly 42 is rotatable with respect to the fixed magnet assembly 38, but in alternative embodiments the magnet assembly 42 may be movable with respect to the fixed magnet assembly 38 in other ways (e.g., translation, rotation and translation, etc.). The magnet holder 34 includes an end plate 46 to secure the rotatable magnet assembly 42 and the fixed magnet assembly 38 within the magnet holder 34. With reference to FIGS. 5A-5B and 8A-8C, the rotatable magnet assembly 42 in the illustrated embodiment includes a rotatable drum 50 and four permanent magnets 54 (e.g., Neodymium magnets) affixed to the rotatable drum 50. The fixed magnet assembly 38 includes four trapezoidal permanent magnets 58 secured within the magnet holder 34 in the illustrated embodiment. In alternative embodiments, the rotatable magnet assembly and the fixed magnet assembly may each include one or more permanent magnets. As illustrated in FIGS. 5A and 5B, the trapezoidal permanent magnets 58 each include a north (N) and a south (S) pole that are laterally spaced with respect to a longitudinal axis 62 of the magnetic base 22. Likewise, the permanent magnets 54 of the rotatable magnet assembly 42 each include a north (N) and a south (S) pole that are laterally spaced with respect to the longitudinal axis 62 in the positions shown in FIGS. 5A and 5B. With continued reference to FIGS. 5A and 5B, the magnet holder 34 includes bores 63 in which to receive and store fasteners 64, the use of which is explained in further detail below.

Figure 6:
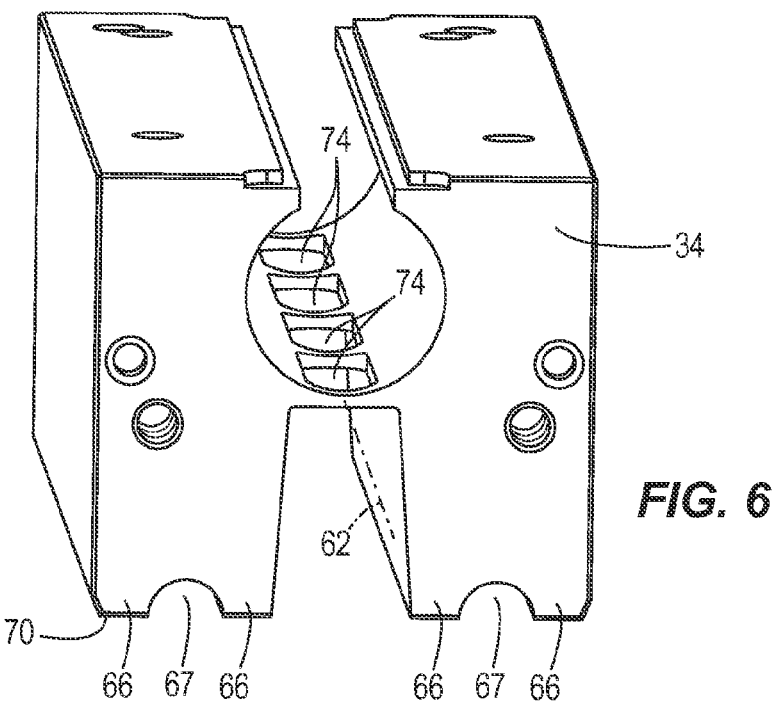
FIG. 6 is a perspective view of a magnet holder of the magnetic base of FIG. 2.

With reference to FIG. 6, the magnet holder 34 is shown with the rotatable magnet assembly 42 and the fixed magnet assembly 38 removed to better illustrate the geometry of the magnet holder 34. The magnet holder 34 in the illustrated embodiment includes ridges 66 and grooves 67 defined between adjacent ridges 66 formed on a bottom surface 70 (i.e., the surface that engages the ferromagnetic workpiece). In the illustrated embodiment, the magnet holder 34 includes four ridges 66 and two grooves 67, the importance of which is described in greater detail below. In addition, the magnet holder 34 includes slots 74 formed between the rotatable magnet assembly 42 and the fixed magnet assembly 38.

Figure 2:
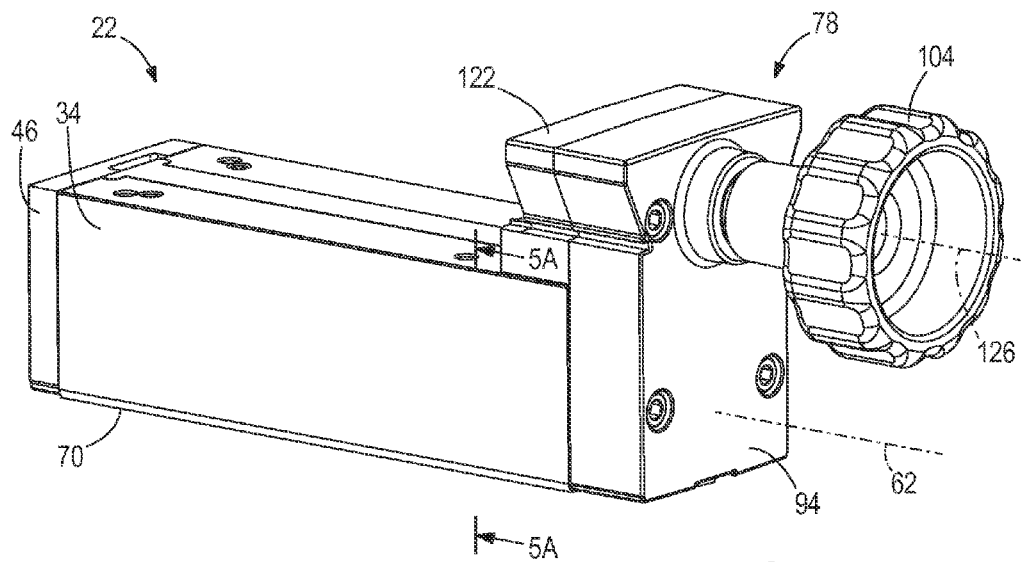
FIG. 2 is a rear perspective view of the magnetic base of FIG. 1.
Figure 3:
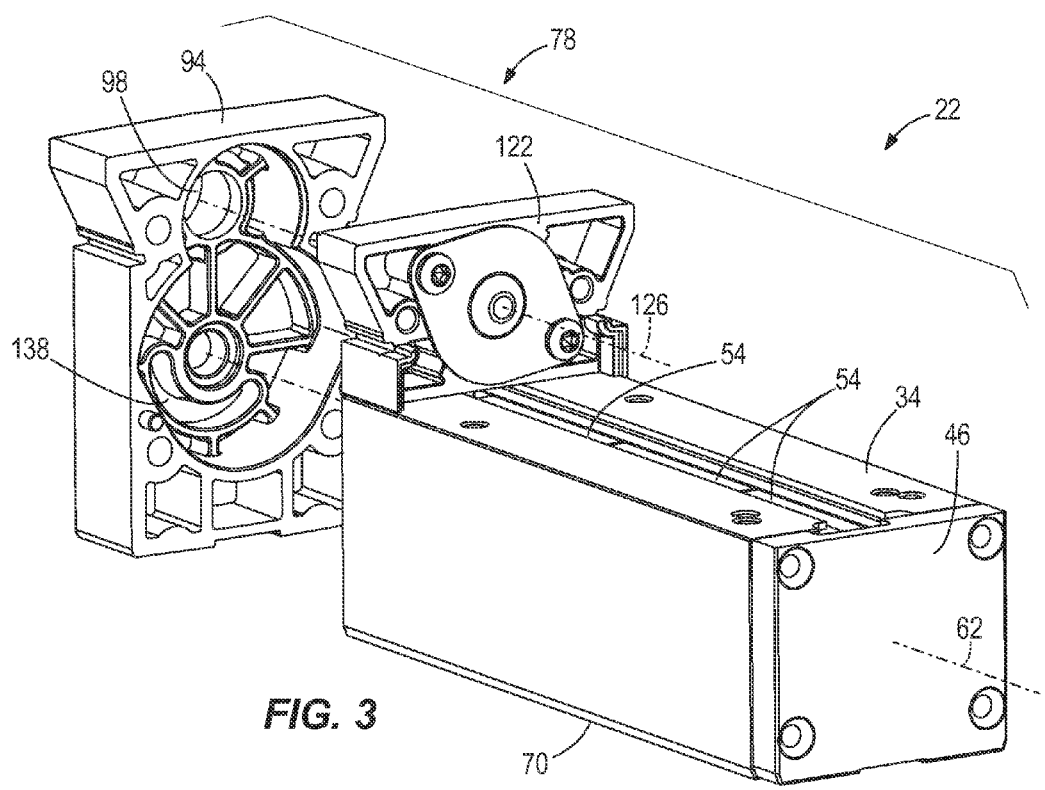
FIG. 3 is an exploded front perspective view of the magnetic base of FIG. 2.
Figure 4:
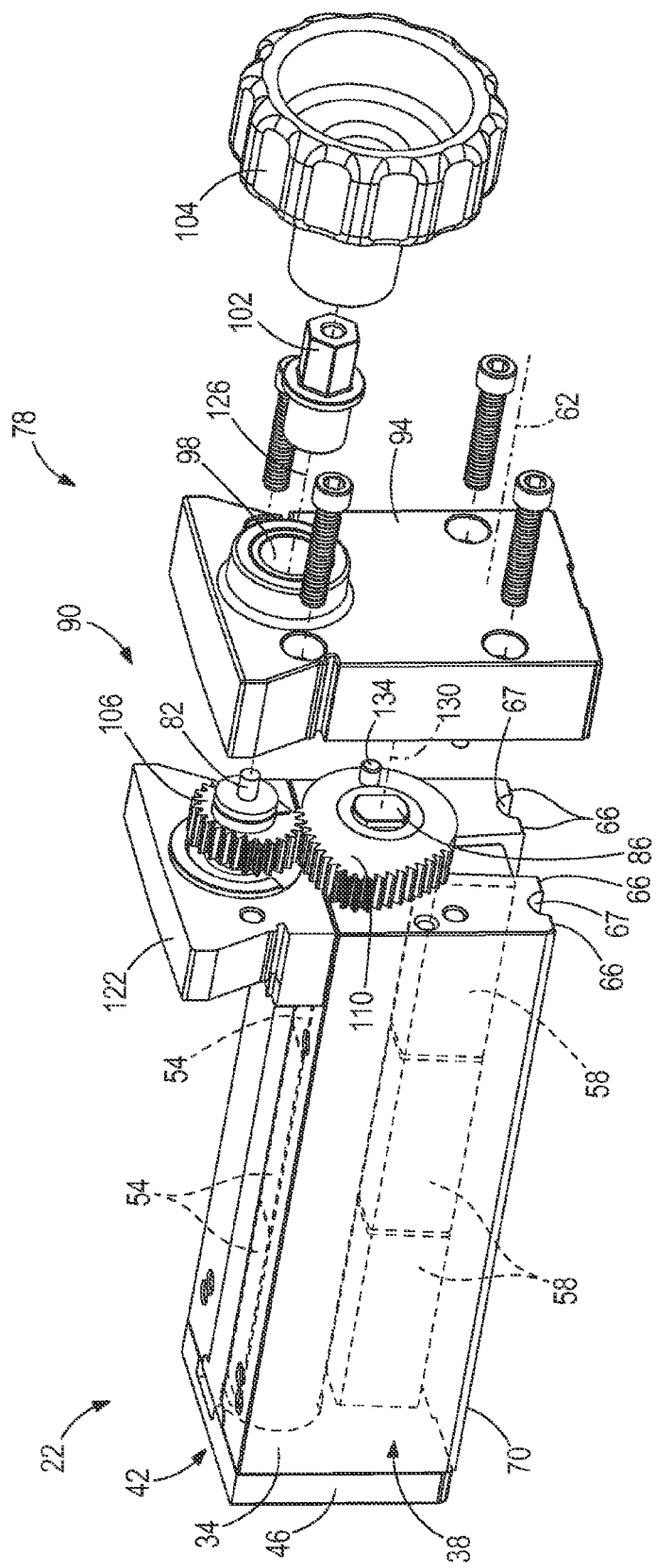
FIG. 4 is an exploded rear perspective view of the magnetic base of FIG. 2.

With reference to FIGS. 2-4, the magnetic base 22 further includes a transmission 78 having an input 82, an output 86, and a plurality of transmission elements (e.g., a gear train 90) positioned between the output 86 and the input 82. As discussed in more detail below, the gear train 90 is configured to provide a variable mechanical advantage (e.g., a variable gear ratio) between the output 86 and the input 82. The transmission 78 also includes a cover 94 enclosing the gear train 90 and having an aperture 98 through which the input 82 extends. A hexagonal body 102 and input knob 104 are coupled for co-rotation with the transmission input 82, and the input knob 104 is accessible to the user of the magnetic drill press 10 for actuating the transmission 78. The user can apply torque to the transmission input 82 using the input knob 104.

Figure 9:
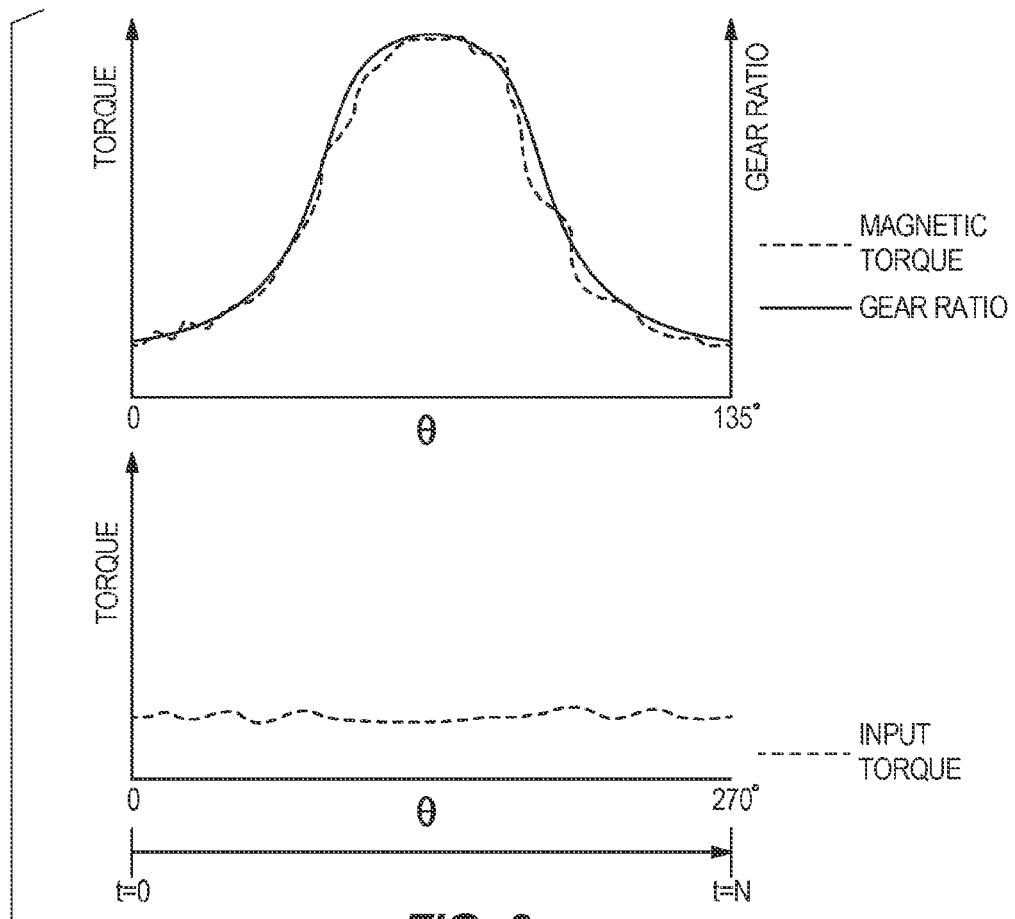
FIG. 9 is a chart comparing torque and gear ratio as a function of rotation angle of the rotatable magnet assembly of FIG. 8A.
Figure 10:
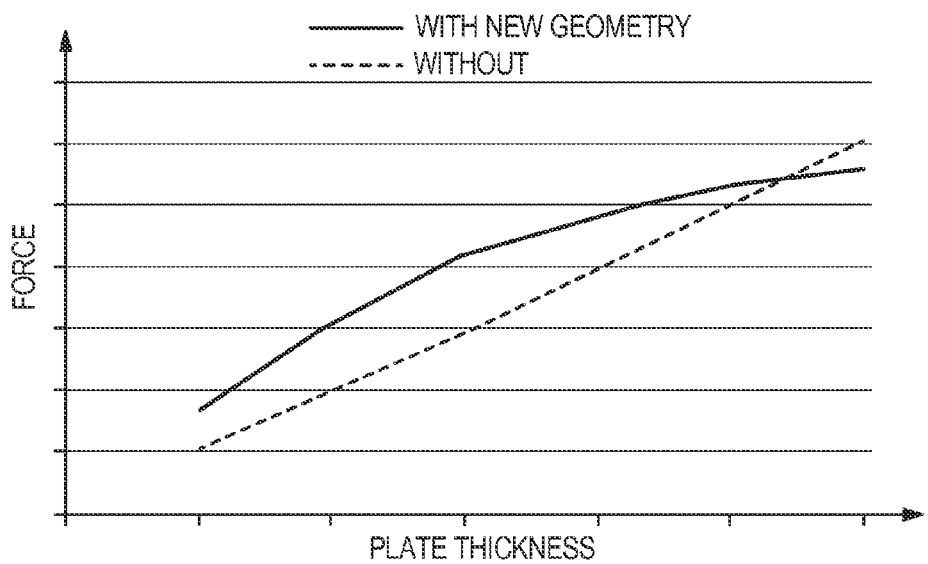
FIG. 10 is a chart comparing magnetic holding force as a function of workpiece thickness of the magnet holder of FIG. 2.

With reference to FIGS. 4, 7 and 8A-8C, the gear train 90 includes a single gear stage with two non-circular gears 106, 110 that are meshed. In alternative embodiments, the gear train may include any number of stages of circular and non-circular gears (e.g., oval-shaped, elliptical, etc.), including other means of torque transmission. In the illustrated embodiment, the two non-circular gears 106, 110 are dissimilar, however alternative embodiments can provide identical non-circular gears. The transmission input 82 is coupled for co-rotation with a first of the non-circular gears 106, and the transmission output 86 and the rotatable magnet assembly 42 are coupled for co-rotation with a second of the non-circular gears 110 (FIGS. 8-10).

With reference to FIG. 4, the input 82 and the first gear 106 are rotatably supported (e.g., by one or more bearings) by a support block 122 secured to the magnet holder 34, and the first gear 106 is operable to rotate about a first, non-central axis 126 when an input torque is applied by the user to the knob 104 and the transmission input 82. The second gear 110 rotates about a second axis 130 parallel to the first axis 126. In alternative embodiments, the second axis 130 may be skewed or perpendicular to the first axis 126. A stop pin 134 extends from the second gear 110 at a location offset from the second axis 130. With reference to FIG. 3, the stop pin 134 is received in an arcuate track 138 to limit the rotation of the second gear 110, and therefore the transmission output 86 and the rotatable magnet assembly 42, to a predetermined rotation angle (e.g., approximately 135 degrees in the illustrated embodiment). The track 138 is defined in the gear cover 94 and spans an arc length nominally greater than 135 degrees to permit the second gear 110 to rotate approximately 135 degrees about the second axis 130. Therefore, the second gear 110 is limited to a predetermined rotation angle of approximately 135 degrees about the second axis 130. In alternative embodiments, the arc length of the track may be different depending upon the predetermined rotation angle of the second gear 110 (e.g., approximately 180 degrees). The variable gear ratio provided by the first gear 106 and the second gear 110 exhibits an overall, average gear ratio of 2:1 over the entire range of motion. Therefore, the input gear 106 and the input knob 104 are limited to a range of rotation equal to approximately 270 degrees. In other words, in the illustrated embodiment, the second gear 110 rotates 135 degrees from start to finish, which corresponds with the first gear 106 rotating 270 degrees from start to finish.

With reference to FIG. 4, the transmission output 86 is operable to rotate the rotatable magnet assembly 42 relative to the fixed magnet assembly 38 through the predetermined rotation angle to actuate the magnetic base 22 between a first configuration (i.e., a latched configuration, FIG. 5A) in which the base 22 can magnetically latch to a ferromagnetic workpiece, and a second configuration (i.e., a release configuration, FIG. 5B) in which the base 22 cannot magnetically latch to the ferromagnetic workpiece. In the release configuration, the magnetic poles (N, S) of the rotatable magnet assembly 42 are positioned such that the north poles N of the rotatable magnet assembly 42 are diagonally offset from the north poles N of the fixed magnet assembly 38, as shown in FIG. 5B. Similarly, the corresponding south poles S of the rotatable magnet assembly 42 and the fixed magnet assembly 38 are diagonally offset from each other. When in the release configuration, the magnetic fields of the rotatable magnet assembly 42 and the fixed magnet assembly 38 are mostly contained within the magnet holder 34 (i.e., almost none of the magnetic field flows through the workpiece, but rather is short-circuited within the magnet holder 34). With the magnetic base 22 in the release configuration, the user is able to position the magnetic drill press 10 with respect to the ferromagnetic workpiece in preparation for a drilling operation. To latch the magnetic base 22 to a ferromagnetic workpiece, the magnetic base 22 is actuated from the release configuration (FIG. 5B) to the latched configuration (FIG. 5A). In the latched configuration, the north and south poles N, S of the rotatable magnet assembly 42 and the fixed magnet assembly 38, respectively, are oriented in the same direction (i.e., the north poles N of both the rotatable magnet assembly 42 and the fixed magnet assembly 38 are on the same side of the base 22). When in the latched configuration, the magnetic fields of the rotatable magnet assembly 42 and the fixed magnet assembly 38 are directed externally of the magnet holder 34 and into the ferromagnetic workpiece.

Figure 5C:
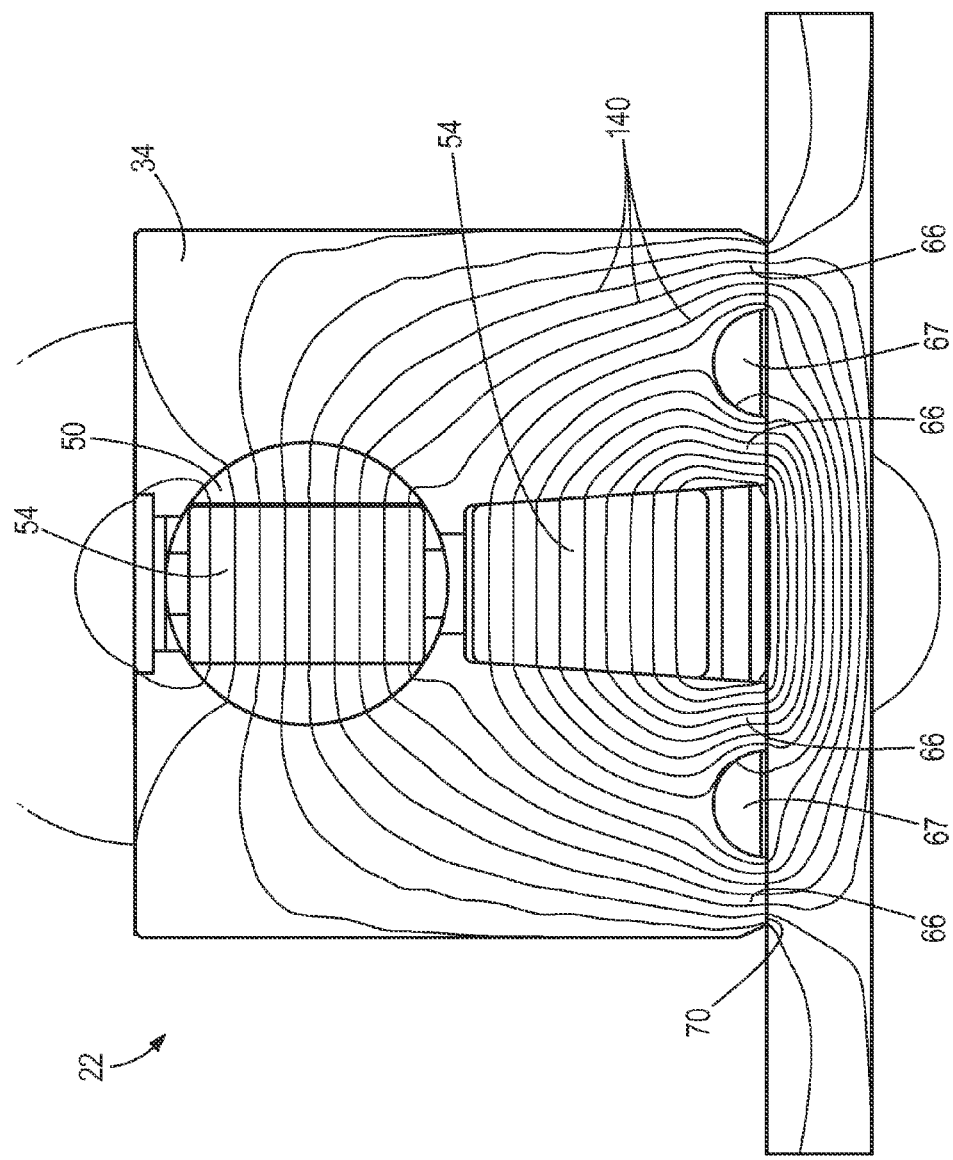
FIG. 5C is a cross-sectional view of the magnetic base of FIG. 2 in the latching configuration, magnetically latched to a workpiece.

With reference to FIG. 5C, lines of magnetic flux 140 are illustrated with the magnetic base 22 in the latched configuration. When the magnetic flux 140 passes through a ferromagnetic workpiece in contact with the magnet holder 34, a resultant holding force is established between the magnetic base 22 and the ferromagnetic workpiece. The grooves 67 (i.e., the absence of magnetic material) create a high density of magnetic flux in the ridges 66, which results in a high holding force present at the ridges 66. Including the grooves 67 on the bottom surface 70 thereby provide high magnetic flux density with controlled saturation in the ridges 66 to increase the holding force, in comparison to a similar magnetic base in which the bottom surface 70 is entirely flat. In particular, the holding force is increased for relatively thin workpieces by including the grooves 67. With reference to FIG. 10, the holding force is illustrated as a function of the workpiece thickness for the magnetic base 22 with grooves 67, and a similar magnetic base but without any grooves. As shown in a substantial part of the range of FIG. 10, as the workpiece plate thickness decreases, the holding force for the magnetic base 22 with grooves 67 is larger than the magnetic base without any grooves. In other words, the ridges 66, the grooves 67, and the slots 74 formed in the magnet holder 34 adjust the magnetic characteristics (i.e., magnetic saturation) of the magnetic base 22 to improve the holding force between the magnetic base 22 and relatively thin ferromagnetic workpieces. With the magnetic base 22 latched or fixed to a ferromagnetic workpiece, the drill unit 14 can be utilized, for example, to drill through the ferromagnetic workpiece.

Magnets exhibit repulsion when like poles (i.e., both north poles, or both south poles) face each other and the strength of the repulsion depends on the distance between the like poles. Changing the position of a first magnet with respect to a second magnet will also change the repulsion created as the first magnet is moved from one position to another. In the case of the magnetic base 22, the repulsion between like poles of the rotatable magnet assembly 42 and the fixed magnet assembly 38 impart a reaction torque or "magnet torque" on the transmission output 86 as the rotatable magnet assembly 42 is rotated between the release configuration and the latched configuration. The magnet torque is loaded on the transmission output 86, and the load is reflected through the transmission 78 to the transmission input 82 and the input knob 104. In FIG. 9, the magnet torque is illustrated as a function of the degree of rotation of the rotatable magnet assembly 42. Specifically, FIG. 9 illustrates a range of rotation angle of 135 degrees for the rotatable magnet assembly 42, and a range of rotation angle of 270 degrees for the input knob 104. As shown in FIG. 9, the magnet torque is variable over the 135 degree range of rotation angle. The spike in magnet torque followed by the decrease in the magnitude of the magnet torque at approximately 70 degrees is a result of the geometric design and magnetic characteristics of the magnetic base 22. The magnet torque, if not accounted for in the manner described below of the invention, can cause the user to have to apply a large amount of torque, possibly exceeding human capabilities, to rotate the rotatable magnet assembly 42 between the release configuration and the latched configuration.

Figure 8A:
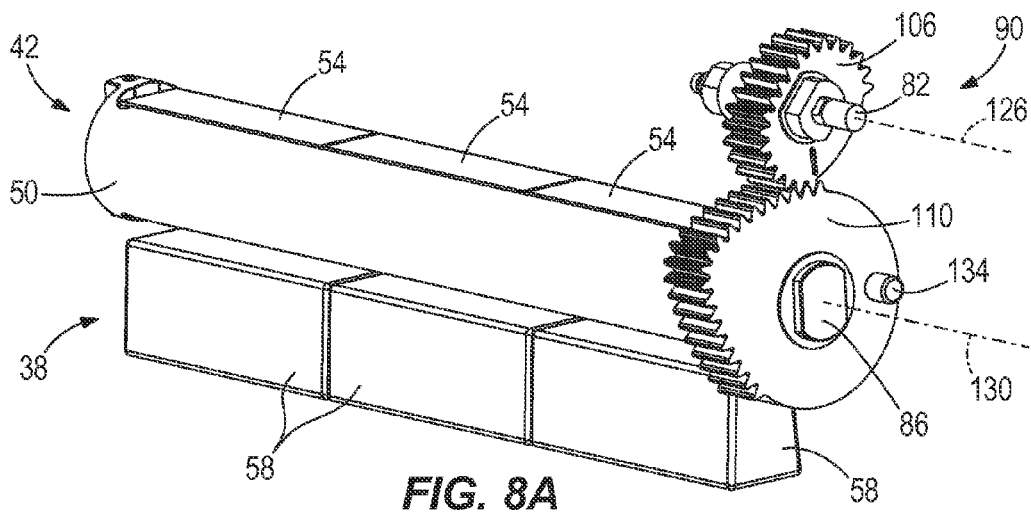
FIG. 8A is a perspective view of a transmission including the gear train of FIG. 7, a rotatable magnet assembly coupled to the transmission, and a fixed magnet assembly of the magnetic base of FIG. 2, illustrating the rotatable magnet assembly in a position coinciding with the latching configuration of the magnetic base.
Figure 8B:
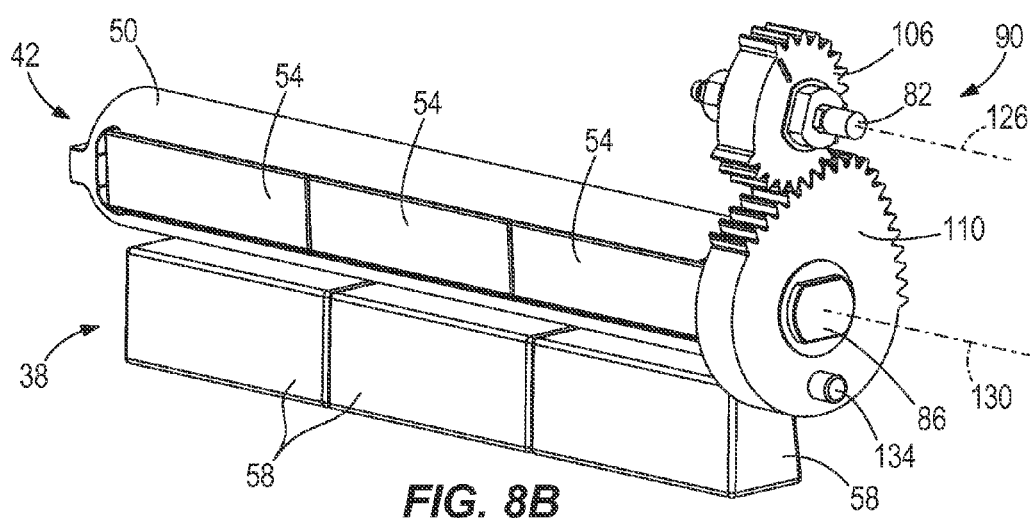
FIG. 8B is a perspective view of the transmission, the rotatable magnet assembly, and the fixed magnet assembly of FIG. 8A, illustrating the rotatable magnet assembly in a position between the latching configuration and the release configuration of the magnetic base.
Figure 8C:
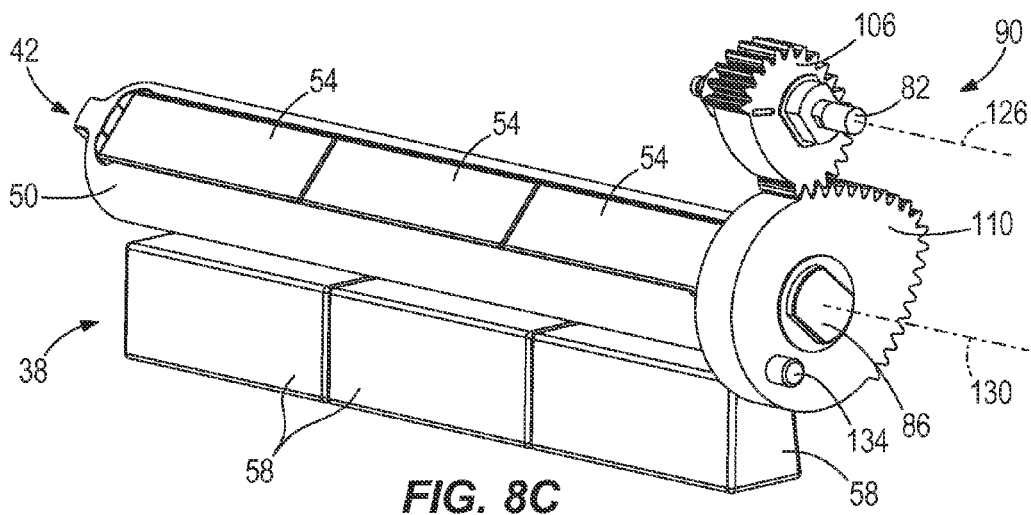
FIG. 8C is a perspective view of the transmission, the rotatable magnet assembly, and the fixed magnet assembly of FIG. 8A, illustrating the rotatable magnet assembly in a position coinciding with the release configuration of the magnetic base.

With reference to FIGS. 8A, 8B, and 8C, the magnet holder 34 and the gear case 94 are removed to clearly illustrate the orientation of the first gear 106, the second gear 110, and the rotatable magnet assembly 42. FIG. 8C illustrates the magnetic base 22 in the release configuration with the north poles N poles of the rotatable magnet assembly 42 diagonally offset from the north poles N of the fixed magnet assembly 38. In the release configuration, the magnetic fields from the rotatable magnet assembly 42 and the fixed magnet assembly 38 are mostly contained within the magnet holder 34; therefore, any holding force generated by the magnetic base 22 while in this configuration is insufficient to latch the base 22 to a ferromagnetic workpiece. As the user applies torque to the transmission input 82 via the input knob 104 and causes clockwise rotation (as viewed from FIG. 8C) of the first gear 106 about the first axis 126, the meshed second gear 110 will rotate counter-clockwise about the second axis 130. As the second gear 110 rotates, the stop pin 134 rotates therewith in the track 138 defined in the gear train cover 94. FIG. 8B illustrates the magnetic base 22 in a transitional configuration between the release and the latched configuration, with the rotatable magnet assembly 42 rotated approximately 45 degrees. FIG. 8A illustrates the magnetic base 22 in the latched configuration with the second gear 110 having traveled the predetermined rotation angle (i.e., about 135 degrees) and the first gear 106 having traveled the predetermined rotation angle (i.e., about 270 degrees).

Figure 7:
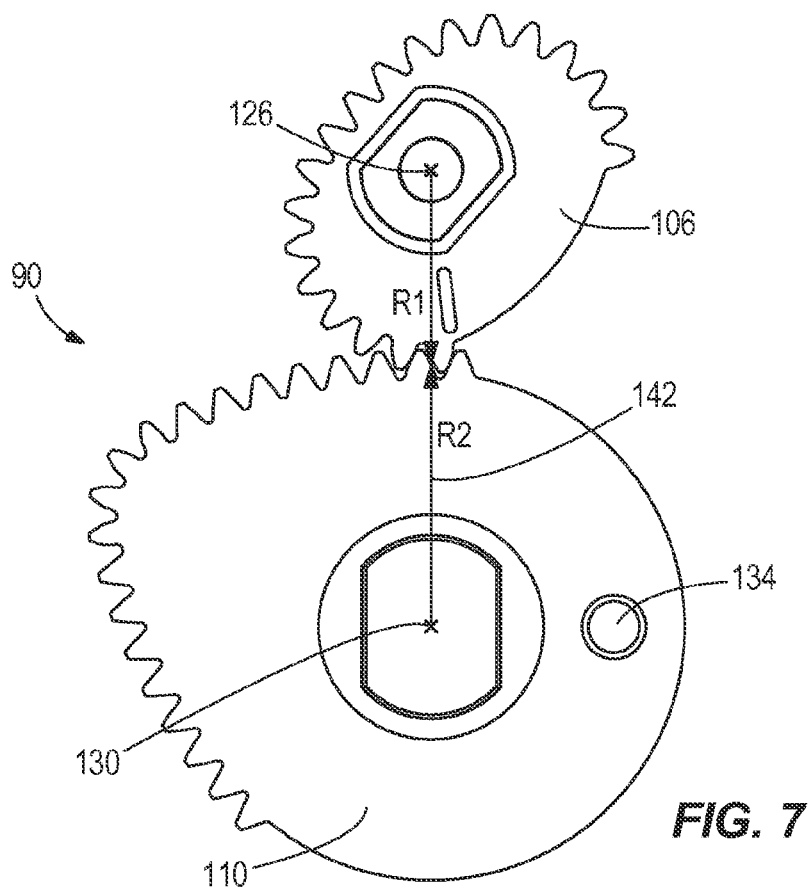
FIG. 7 is a front view of a gear train of the magnetic base of FIG. 2.

With reference to FIG. 9, the variable gear ratio of the gear train 90 is illustrated as a function of the predetermined rotational angle of approximately 135 degrees (i.e., the rotational span of the rotatable magnet assembly 42). As shown in FIG. 9, the gear ratio is designed to provide a larger mechanical advantage (i.e., a large gear ratio) when the magnet torque is large, and to provide a smaller mechanical advantage (i.e., a small gear ratio) when the magnet torque is small. With reference to FIG. 7, the meshed gears 106, 110 form a line of contact 142 between the rotational axes 126, 130 of the gears, and the radius of each of the gears 106, 110 continuously changes during rotation. In other words, the gear ratio is the smallest when the first gear 106 radius R1 along the line of contact 142 is the largest and the second gear 110 radius R2 along the line of contact 142 is the smallest. Likewise, the gear ratio is the largest when the first gear 106 radius R1 along the line of contact 142 is the smallest and the second gear 110 radius R2 along the line of contact 142 is the largest.

The gear train 90 is configured to apply a variable output torque to the rotatable magnet assembly 42 through at least a portion of the predetermined rotation angle of the rotatable magnet assembly 42. The variable gear ratio generally increases when the magnet torque increases, and generally decreases when the magnet torque decreases. In addition, as described above, the variable gear ratio has an overall, average 2:1 gear ratio over the entire range of motion. With reference to FIG. 9, the variable gear ratio is designed to follow the magnet torque so that the torque input required by the user is generally constant (i.e., within a band of about 5 N-m) during a substantial portion (i.e., at least about 75%) of the predetermined rotation angle of the rotatable magnet assembly 42 between the release configuration and the latched configuration. More specifically, the torque input required by the user is within a band of about 2.5 N-m during at least about 64% of the predetermined rotation angle. The first gear 106 meshed with the second gear 110 in the illustrated embodiment provides the variable gear ratio (i.e. R2/R1) with a range between about 1:1 and about 4:1, and more specifically between about 1.4:1 and about 3.5:1. Alternatively, the variable gear ratio may have any range, including between about 1:2.4 and about 2.4:1, and between about 1:9 and about 9:1. In other words, the gear train 90 is configured to receive an input torque from the user for rotating the rotatable magnet assembly 42 through the predetermined rotation angle, and the input torque is kept within human capabilities without large spikes in required input torque throughout the entire range of the predetermined rotation angle. In alternative embodiments, the transmission elements can provide any range of gear ratios, including reduced ratios (e.g., 1:2).

The transmission 78 creates an improved feel for the user as the magnetic base 22 is switched between the latched configuration and the release configuration. In contrast, prior art magnetic bases required a spike in input torque by the user to account for the non-linear magnet torque. This spike in required input torque creates an unstable feel for the user and can exceed the user's physical ability. The magnetic base 22 of the invention eliminates these problems by making the input torque applied by the user generally constant throughout a substantial range of rotation angle of the rotatable magnet assembly 42, thereby eliminating any spikes in required input torque and keeping the applied input torque within a user's physical ability. In addition, not only is the required input torque kept within a user's physical ability with the transmission 78, but the amount of required input rotation is also reduced. Commercially available drill presses utilize a constant gear ratio (e.g., 5:1) which keeps the required input torque low, but requires a relatively large amount of input rotation by the user (e.g., 675 degrees). In other words, the transmission 78 simultaneously reduces the required input torque and the required input rotation.

In alternative embodiments, the transmission input 82 can be rotated by an amount that is independent (i.e., different) than that of the transmission output 86 for actuating the magnetic base 22 between the latched and release configurations (i.e., the transmission input 82 can be rotated more or less than the required transmission output 86 rotation). For example, to make the user's operation of switching the magnetic base 22 between the latched configuration and the release configuration intuitive, the knob 104 and transmission input 82 can be rotated about 180 degrees to actuate the magnetic base 22 between the latched and release configurations. In alternative embodiments, a motor can be included to switch the magnetic base between the release configuration and the latched configuration instead of requiring user input torque and rotation. The motor can be advantageously selected to be efficient and small as a result of the variable mechanical advantage provided by the transmission 78. In other words, since the motor needs only to be designed to handle a uniform load profile (i.e., a relatively constant torque), the design specifications for the motor become simplified.

In the illustrated embodiment, the transmission input 82 is rotated clockwise (as viewed from FIG. 8C) to switch the magnetic base 22 from the release configuration to the latched configuration. However, in other embodiments, the gear train 90 may be configured such that the transmission input 82 is rotated counter-clockwise to switch the magnetic base 22 from the release configuration to the latched configuration. In further alternative embodiments, the variable gear ratio could be designed to exactly match the variable magnet torque, resulting in an input torque held within a band of 1 N-m or less across a substantial portion of rotation angle of the rotatable magnet assembly 42. In general, in alternative embodiments, the transmission can be customized to provide any user experience regarding the required input torque (i.e., gradually increasing input torque, gradually decreasing input torque, oscillating input torque, etc.). In alternative embodiments, the transmission could include any number and configuration of transmission elements (e.g., linkages, gears, cams, etc.) that provide a variable mechanical advantage between the transmission input 82 and the transmission output 86.

Figure 12:
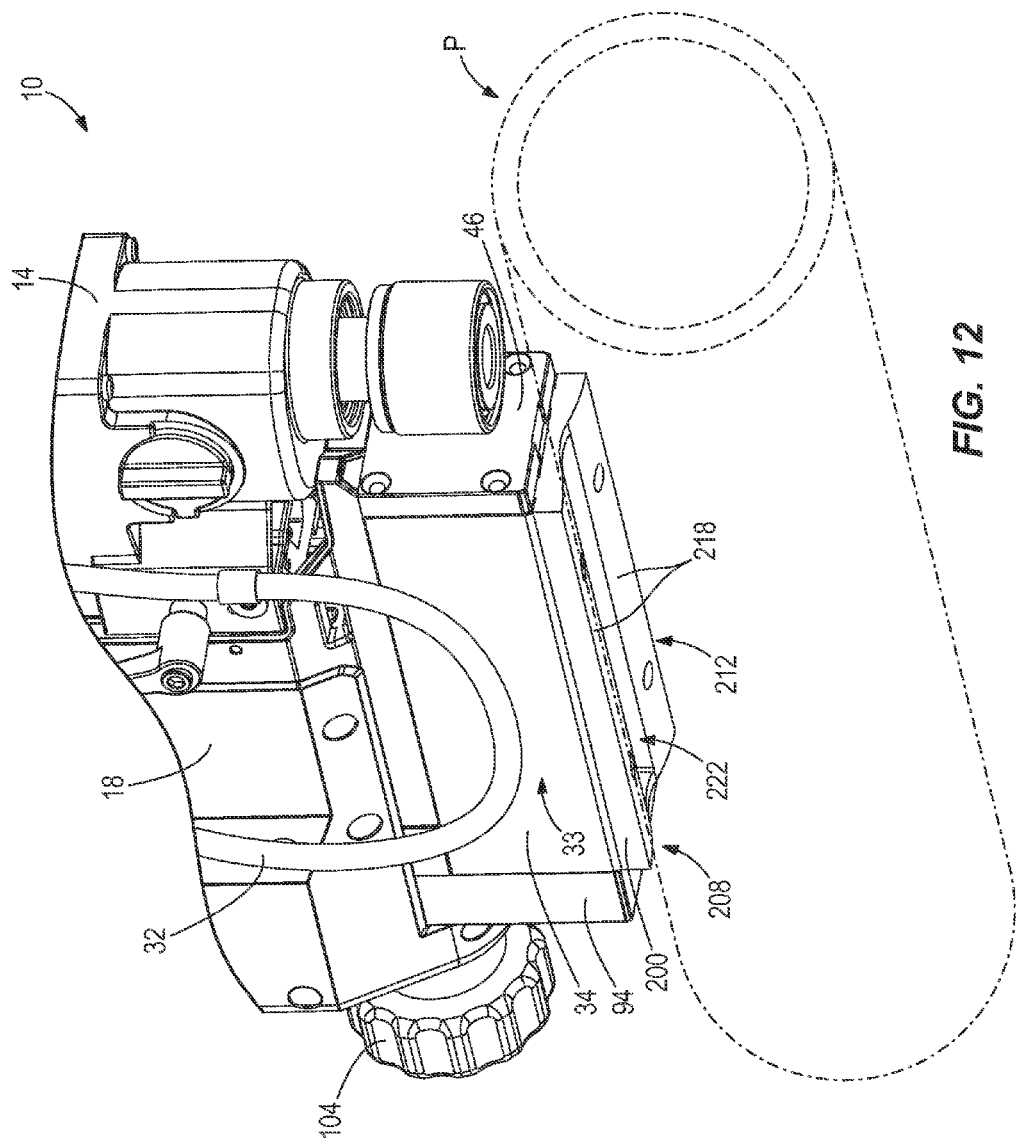
FIG. 12 is a bottom perspective view of the magnetic drill press of FIG. 1 including an adapter for mounting the magnetic drill press on a non-flat surface.
Figure 13:
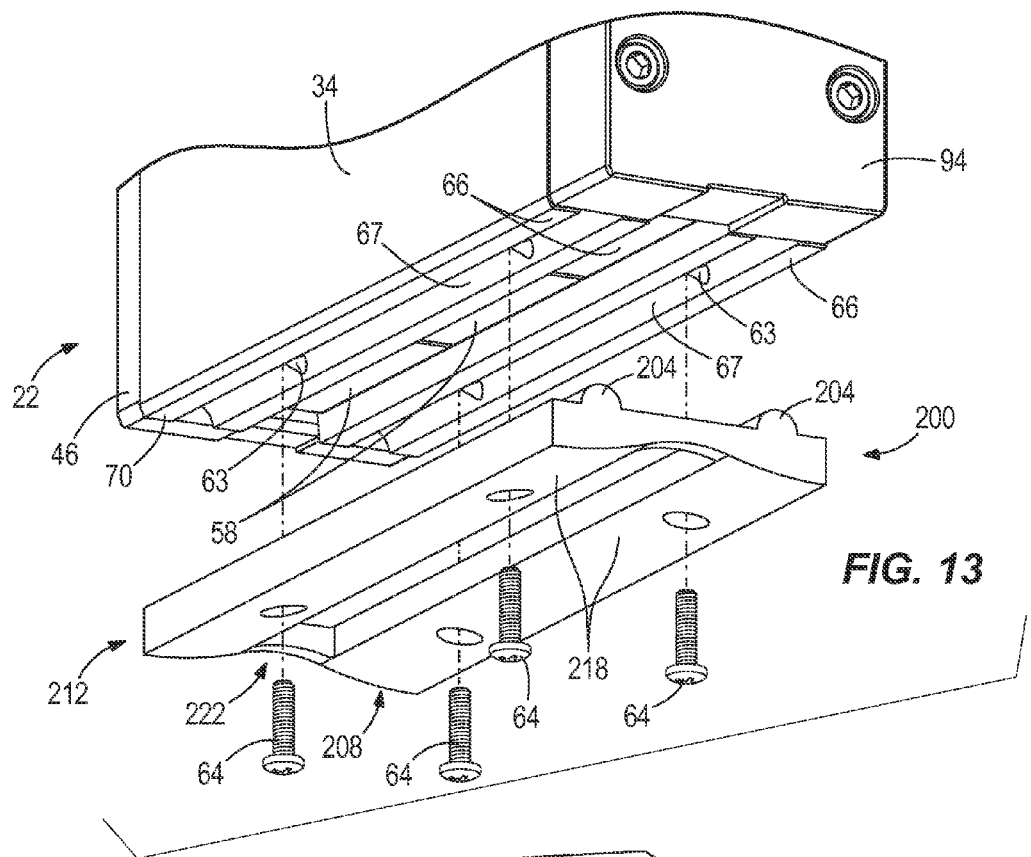
FIG. 13 is an exploded, bottom perspective view of the magnetic base and the adapter of FIG. 12.
Figure 14:
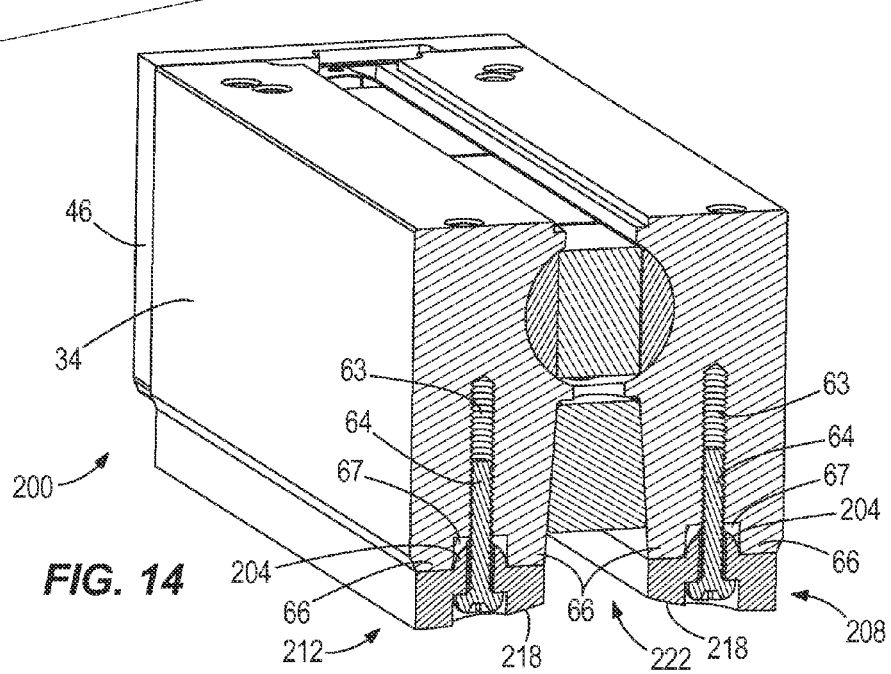
FIG. 14 is a cross-sectional view of the magnetic base and the adapter of FIG. 12.

With reference to FIGS. 12-14, the drill press 10 may also include an adapter 200. In some applications, it is desired to use the magnetic drill press 10 on a non-flat, or curved, surface (e.g., a pipe P). The adapter 200 is removably coupled to the magnet holder 34 to facilitate placement of the magnet holder 34 on a curved ferromagnetic workpiece. The adapter 200 includes a plurality of projections 204 received within the corresponding grooves 67 in the magnet holder 34 (FIG. 13). The adapter 200 is secured to the magnet holder 34 with the fasteners 64 which, in turn, are threaded within the bores 63. The adapter 200 includes a first side portion 208 and a second side portion 212, and each of the side portions 208, 212 includes a curved surface 218 that is engageable with the curved ferromagnetic workpiece. A window 222 is defined between the first side portion 208 and the second side portion 212.

In the illustrated embodiment, the window 222 is unobstructed; however, alternative embodiments may include non-ferromagnetic material within the window. When the adapter 200 is removed from the magnet holder 34 and is not in use, the fasteners 64 may be stored within the bores 63 in the magnet holder 34 until the adapter 200 is attached again. The curved surfaces 218 provide at least two points of contact on which to support the magnet holder 34 on workpieces having a variety of curvature. In other words, the curved surfaces 218 allow the magnet holder 34 to be supported on a range of pipe diameters, for example. In alternative embodiments, the adapter may include a non-metal (e.g., plastic) frame and a plurality of ferromagnetic blocks secured together by the frame. The blocks may further include a curved surface that is engageable with the curved ferromagnetic workpiece.

Various features of the invention are set forth in the following claims.

What is claimed is:

1. A magnetic base for selectively magnetically latching to a ferromagnetic surface, the magnetic base comprising:
    a magnet holder;
    a fixed magnet assembly supported within the magnet holder;
    a movable magnet assembly supported within the magnet holder; and
    a transmission including
        an input,
        an output coupled to the movable magnet assembly for moving the movable magnet assembly relative to the fixed magnet assembly through a predetermined range of motion, and
        a plurality of transmission elements positioned between the output and the input, the elements configured to provide a variable mechanical advantage between the output and the input during at least a portion of the predetermined range of motion.

2. The magnetic base of claim 1, wherein the movable magnet assembly is rotatable relative to the fixed magnet assembly.

3. The magnetic base of claim 2, wherein the predetermined range of motion of the movable magnet assembly is a predetermined rotation angle, and wherein the movable magnet assembly is rotatable relative to the fixed magnet assembly through the predetermined rotation angle.

4. The magnetic base of claim 3, wherein the moveable magnet assembly is rotated about 135 degrees relative to the fixed magnet assembly to actuate the magnetic base between a first configuration in which the magnetic base can magnetically latch to a ferromagnetic workpiece, and a second configuration in which the magnetic base cannot magnetically latch to the ferromagnetic workpiece.

5. The magnetic base of claim 4, wherein the transmission input is rotated about 270 degrees to actuate the magnetic base between the first and second configurations.

6. The magnetic base of claim 3, wherein the plurality of transmission elements includes a gear train that provides a variable gear ratio between the output and the input during at least a portion of the predetermined rotation angle.

7. The magnetic base of claim 6, wherein the gear train includes two non-circular gears that are meshed.

8. The magnetic base of claim 7, wherein the transmission input is coupled for co-rotation with a first of the non-circular gears, and wherein the transmission output is coupled for co-rotation with a second of the non-circular gears.

9. The magnetic base of claim 6, wherein the gear train is configured to apply a variable output torque to the moveable magnet assembly through at least a portion of the predetermined rotation angle of the moveable magnet assembly, wherein the variable gear ratio generally increases when the variable output torque increases, and wherein the variable gear ratio generally decreases when the variable output torque decreases.

10. The magnetic base of claim 9, wherein the gear train is configured to receive an input torque from the user for rotating the moveable magnet assembly through the predetermined rotation angle, and wherein the input torque is within a band of about 5 N-m during at least 75% of the predetermined rotation angle.

11. The magnetic base of claim 6, further comprising a stop in the gear train for limiting the predetermined rotation angle.

12. The magnetic base of claim 6, wherein the variable gear ratio includes a range between about 1:2.4 and about 2.4:1.

13. The magnetic base of claim 1, wherein the magnet holder includes a slot between the moveable magnet assembly and the fixed magnet assembly.

14. The magnetic base of claim 1, wherein the moveable magnet assembly includes a rotatable drum and a plurality of permanent magnets affixed to the rotatable drum.

15. The magnetic base of claim 1, wherein the magnet holder includes ridges on a surface of the magnet holder engageable with the ferromagnetic workpiece.

16. The magnetic base of claim 15, wherein the magnet holder includes a groove defined between adjacent ridges, and wherein the groove is a first of a plurality of grooves.

17. The magnetic base of claim 16, further comprising an adapter coupled to the magnet holder to facilitate placement of the magnet holder on a curved ferromagnetic workpiece.

18. The magnetic base of claim 17, wherein the adapter includes a plurality of projections received within the corresponding plurality of grooves in the magnet holder.

19. The magnetic base of claim 17, wherein the adapter includes a first side portion and a second side portion, and wherein each of the first and second side portions includes a curved surface that is engageable with the curved ferromagnetic workpiece.

20. The magnetic base of claim 19, wherein the adapter includes a window defined between the first side portion and the second side portion.

* * * * *